United States Patent
Haller et al.

(10) Patent No.: US 6,784,713 B2
(45) Date of Patent: Aug. 31, 2004

(54) CIRCUIT ARRANGEMENT AND METHOD FOR AN ELECTRONIC SYSTEM FOR TIME-DELAYED OUTPUTTING OF A SWITCHING SIGNAL

(75) Inventors: Herbert Haller, Fichtenhof (DE); Harald Schurz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/353,051

(22) Filed: Jan. 29, 2003

(65) Prior Publication Data

US 2003/0174006 A1 Sep. 18, 2003

(30) Foreign Application Priority Data

Jan. 29, 2002 (DE) .......................................... 102 03 373

(51) Int. Cl.⁷ .............................................. H03H 11/26
(52) U.S. Cl. ........................................ 327/269; 327/290
(58) Field of Search ................................ 327/276, 284, 327/290, 269, 270, 271

(56) References Cited

U.S. PATENT DOCUMENTS 5,677,696 A * 10/1997 Silverstein et al. ......... 342/360

6,501,310 B2 * 12/2002 Takami ...................... 327/160

* cited by examiner

Primary Examiner—Timothy P. Callahan
Assistant Examiner—Cassandra Cox
(74) Attorney, Agent, or Firm—Harness, Dickey & Pierce, P.L.C.

(57) ABSTRACT

In order to ensure safe and reliable time-delayed signal outputting with a simple redundant structure of a circuit arrangement, a common actuating element acts on two timers with associated A/D converters. In this case, the time delay which is predetermined by the actuating element and is relevant for the outputting of the switching signal is determined by forming the difference between a total resistance, detected by measurement, and a first resistance element, detected by measurement. This is followed by a comparison of the difference, which reflects second resistance elements that is determined by computation, with a second resistance element which is determined by measurement. The switching signal is then output with a time delay when there is a match between the second resistance element determined by measurement and that determined by computation.

21 Claims, 1 Drawing Sheet

CIRCUIT ARRANGEMENT AND METHOD FOR AN ELECTRONIC SYSTEM FOR TIME-DELAYED OUTPUTTING OF A SWITCHING SIGNAL

The present application hereby claims priority under 35 U.S.C. §119 on German patent application number DE 10203373.0 filed Jan. 29, 2001, the entire contents of which are hereby incorporated herein by reference.

FIELD OF THE INVENTION

The invention generally relates to a circuit arrangement and to a method for an electronic system. In particular, it relates to a safety control system, for time-delayed outputting of a switching signal and to a method.

BACKGROUND OF THE INVENTION

A circuit arrangement and a method are used, for example, as part of an emergency-off or safety circuit and/or in particular as part of a safety control system. They are used for the purpose of processing the switching signals of a safety switch or safety signal transmitter which is arranged on a protection barrier, for example on a protection door.

Depending on the respective position of the protection barrier and accordingly also on the respective switch position of the safety switch or safety signal transmitter, a system part which is arranged within the protection barrier is then immediately stopped or, in particular, is enabled with a time delay. This circuit arrangement is used in particular for moving system parts which, for example have run-on times owing to their inertia.

In detail, this means that safety parts of control systems and/or their protection devices as well as their components must be designed, constructed, selected, assembled and combined in accordance with the appropriate Standards such that they can withstand the influences to be expected.

In order to satisfy these requirements, on the one hand a majority of the control systems, systems or circuits used for safety purposes have a redundant design. Furthermore, on the other hand, functional blocks are checked at time intervals which can be specified. Until now, for this reason, safety programmable electronic controllers or systems have used two controllers. These controllers monitor one another, with duplicated components for adjustment and signal transmission.

SUMMARY OF THE INVENTION

An object of an embodiment of the present invention is to ensure safe and reliable time-delayed signal outputting, with the circuit arrangement having a simple redundant structure.

According to an embodiment of the invention, an advantageous method may be developed for computational and measurement determination of the predetermined time delay and for processing the time delay which is relevant for the outputting of the switching signal.

In comparison to a conventional circuit arrangement having two discrete timers and having in each case one actuating element whose resistance values are determined independently of one another, it is possible according to an embodiment of the invention to save one of the two actuating elements. These are costly, since they have tight component tolerances. In this case, what is now the sole actuating element is used as a common adjusting element for presetting a time delay. On the one hand, this results in a simple and hence advantageous design and simplified production of the circuit arrangement, and on the other hand it results in the reduction in the significant component tolerances.

Existing storage media and control elements can advantageously be used for storing and implementing a program.

In this case, the total resistance of the circuit arrangement, a first resistance branch as part of the first timer is determined using a method, and the second resistance branch is determined separately from the difference between the remaining and second resistance branch as part of the second timer. During a subsequent comparison, any component tolerance which may be present in the resistors in the two resistance branches can be determined in a simple manner, thus taking account of the redundant safety requirement.

BRIEF DESCRIPTION OF THE DRAWINGS

The invention as well as advantageous refinements according to the features of the claims will be explained in more detail in the following text with reference to the exemplary embodiments which are illustrated in the drawings, in which:

DETAILED DESCRIPTION OF THE PREFERRED EMBODIMENTS

Figure 1:
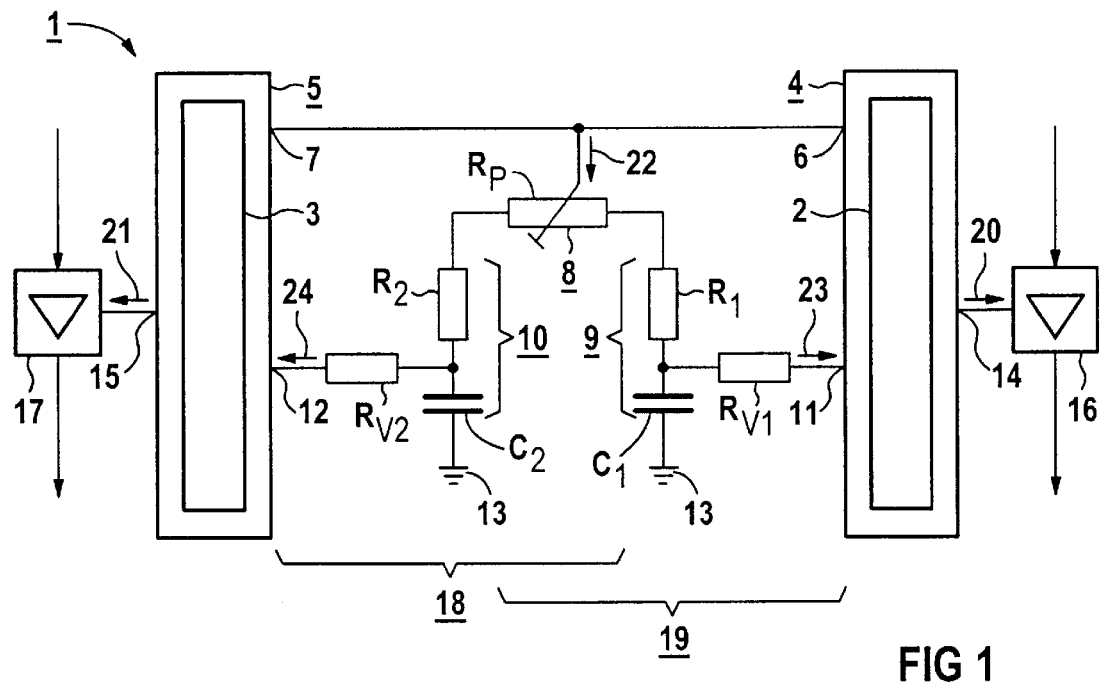
FIG. 1 shows a circuit arrangement with redundant RC elements and controllers.

FIG. 1 shows a circuit arrangement 1 for an electronic system, in particular for a safety control system, which is used for time-delayed outputting of switching signals. The circuit arrangement 1 is in this case provided with a first and a second control unit 2 and 3, which communicate with one another and are redundant. The control units 2, 3 may in this case be used as part of or in the form of a respectively corresponding first or second controller 4 or 5, in particular a microcontroller, and may possibly be in the form of a programmable logic module. The programmable logic module may in this case be programmed by the manufacturer and/or the user.

Both the first and the second control unit 2 and 3 are each connected at a first switchable connection 6 or 7, respectively, to just one actuating element 8, which may be in the form of an adjustable passive electrical component which, as shown in FIG. 1, may be in the form of a variable resistor $R_P$ or an equivalent device. The common actuating element 8 is itself connected to a first and to a redundant second timer 9 and 10, respectively. By way of example, the two timers 9, 10 are each provided with a respective resistor $R_1$ or $R_2$ and a capacitor $C_1$ or $C_2$, for example in the form of an RC element, but may optionally have an equivalent device or be in the form of such an equivalent device.

The resistors $R_1$, $R_2$ are connected in series with the associated respective capacitors $C_1$ and $C_2$, with a first and a second respective series resistor $R_{V1}$ and $R_{V2}$ branching off from the center tap and being connected to the respective second switchable connection 11 or 12 of the respective control units 2 and 3, with the two capacitors $C_1$, $C_2$ being connected to a ground potential 13. The two control units 4, 5 of the two respective timers 9 and 10 are in this case used for computational and measurement determination of the time delay which is predetermined by the actuating element 8, and for processing the time delay that is relevant for outputting of the switching signal 20, 21.

The two control units 2, 3 furthermore have and control a respective switching output 14 and 1, which are connected to a respective first and a second electrical module 16 and 17, in particular an output driver. The second controller 5 switches off each switching output 15 without any delay in response to a sensor request—for example emergency off; in contrast, the first controller 4 switches off its switching output 14 with a time delay or offset. The time delay is in this case directly proportional to the setting of the resistance value $x*R_P$ of the actuating element 8, but is updated only once the actuating element 8 in the respective controller 4, 5 is at rest. The configuration of the circuit arrangement 1 that results in this case acts in the sense of a first and of a second discrete A/D converter 18 and 19.

The configuration of the two A/D converters 18, 19 with a common actuating element 8 makes it possible to make savings by reducing the number of components and the manufacturing complexity. Exact positioning of two actuating elements arranged one behind the other and the need to pass accurately through the rotation axis that this involves, and as is required for separate A/D converters, can accordingly be avoided. In comparison to a conventional design with two discrete A/D converters and two separate actuating elements in the form of coded plugs or slide switches, the circuit arrangement 1 allows continuously variable fine adjustment. Furthermore, the use of adjustable passive components instead of a slide switch allows the use of a low-cost controller with fewer inputs and outputs than a slide switch.

Figure 2:
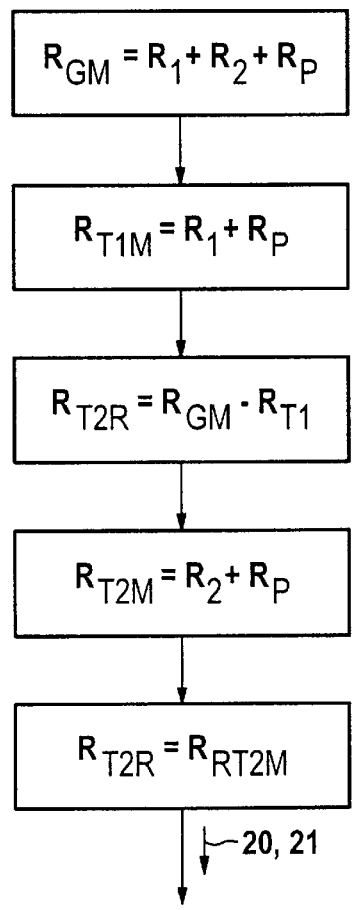
FIG. 2 shows a flowchart based on the method.

FIG. 2 shows a flowchart based on the method, which is essentially used for computational and measurement determination of a predetermined time delay and for processing the time delay which is relevant for the outputting of a switching signal 20, 21.

First of all, a total resistance $R_{GM}$, which represents the respective resistance $R_1$, $R_2$ or $R_P$ of the first and of the second timer 9 or 10, respectively, and of the actuating element 8, is determined by measurement. A first resistance element $R_{TIM}$ which represents the respective resistance $R_1$ or $R_P$ of the first timer 9 and of the actuating element 8, is then determined by measurement.

A second resistance element $R_{T2R}$, which represents the respective resistance $R_2$ or $R_P$ of the second timer 10 and of the actuating element 8, is then determined by computation by subtraction of the first resistance element $R_{TIM}$ from the total resistance $R_{GM}$. The second resistance element $R_{T2M}$, which represents the respective resistance $R_2$ or $R_P$ of the second timer 10 and of the actuating element 8, is then determined by measurement. Finally, the computationally determined second resistance element $R_{T2R}$ is compared with the second resistance element $R_{T2M}$ determined by measurement, and the switching signal 20, 21 is output with a time delay as a function of the comparison.

According to FIG. 1 and FIG. 2, the first and the second controllers 4 and 5 respectively operate as a master and a slave alternately in a definable interval which, by way of example, may be 5s. Both controllers 4, 5 in the process evaluate the respectively associated A/D converter 18 or 19 independently of one another. Only that controller which is not involved with the actual evaluation process—in this case by way of example the second controller 5—connects its first switchable connection 7, also referred to as a pin, to the input and hence to a high impedance. Its second switchable connection 12 is connected to the output, with a "high" voltage level being applied to it. In this so-called basic position—also referred to as set up—both first switchable connections 6, 7 may also be connected to the input, so that the entire electrical connection for the actuating element 8 has a high impedance, thus likewise preventing any current flow $R_P$.

The evaluating first controller 4 then initiates discharging of the first capacitor $C_1$, by disconnecting the two associated switchable connections 6, 11 from the voltage, that is to say by applying the "low" voltage level to them. Connection of the second switchable connection 11 to the output and to the "low" voltage level connects this connection 11 to ground, and likewise leads to discharging of the first capacitor $C_1$. After this, the first and the second switchable connections 6 and 11, respectively, are switched to have a high impedance during the measurement of the charging time via the total resistance $R_{GM}$, comprising the resistances $R_P$, $R_1$ and $R_2$ of the actuating element 8, of the first timer 9 and of the second timer 10, respectively.

A counter in the first and/or in the second controller 4 or 5, respectively, is now incremented until the second switchable connection 11 identifies a "high" voltage level on its series resistor $R_{V1}$. The numerical value determined in this way is then stored as the total charging time in the first and/or in the second controller 4 or 5, respectively. The voltage level can be determined depending on the controller and hence produces the desired time delay more quickly, the faster it is reached.

During the measurement of the delay time which is set via the actuating element 8, the first capacitor $C_1$ is discharged, after which the charging time is measured via the resistance chain which corresponds to the total resistance $R_{GM}$. The resistance $R_P$ of the actuating element 8 that is included in this is in this case provided with an adjustment factor x. In this case, the second switchable connection 11 of the first controller 4 is connected to the input, and hence to a high impedance, and the first switchable connection 6 of the first controller is connected to the "high" voltage level. The second switchable connection 12 of the second controller 5 is also connected to the output, and to the "high" voltage level.

A charging current can now flow via the resistance chain, so that the first capacitor is gradually charged. At the same time, a counter is started and increments its numerical value until the "high" voltage level is present at the second switchable connection 11 of the first controller 4. This numerical value, which is obtained indirectly from the resistance chain and in the end from a time value, is stored. The second switchable connection 11 of the first controller 4 is then connected to the output and to the "low" voltage level, so that the first capacitor $C_2$ can be discharged.

Depending on the master or slave status, the first and the second timer 9 and 10 in each case intrinsically converts a common input signal 14 to a respective first and second time-delayed output signal 15 and 16, respectively. The input signal 14 is in this case passed via a common actuating element 8, so that the respective time delay can be set for both the first timer 9 and the second timer 10. The time delay setting is in this case read by the two A/D converters 18, 19, with the respectively associated first or second controller 4 or 5 evaluating the delay time to be set by the actuating element 8, which corresponds to conversion of an analogue signal to a digital signal in the sense of a signal conversion.

A/D converters 18, 19 are evaluated differently for the two controllers 4, 5. Depending on the position of the actuating element 8—for example of the left-hand stop—the second controller 5 calculates a first time value. The first controller 4 accordingly calculates a total time value minus the preset time value. The left-hand resistance branch, which is correlated with the left-hand stop and is also the normal or reference branch, is the part that is relevant for the time delay. While the actuating element 8 is at the right-hand stop, the evaluation is carried out in the correspondingly opposite manner.

For the first-mentioned case, the second switchable connection 11 is connected to the input, and the first switchable connection 6 of the first controller 4 is connected to the output and to the "high" voltage level. The "high" voltage level corresponds, for example, to a voltage of 5V. The first capacitor $C_1$ is charged via the adjusted actuating element 8 and the resistance $R_1$ of the first timer. The first controller 4 detects and stores the time value of this section. Two measurements of the charging time are carried out during the evaluation process for this purpose.

The charging time via the resistance chain $R_{GM}$, $R_1$ and $R_2$ is measured first of all. After this, the first capacitor $C_1$ is discharged, and the charging time is then determined via the adjusted resistance value of the actuating element 8 $((1-x)*R_P)$ and the resistance $R_1$ of the first timer 9. During its evaluation process, the second controller 10 manages the charging time of the capacitor via the resistance value that has been set for the actuating element 8 and the resistance $R_2$ of the second timer 10.

For this purpose, the second switchable connection 11 of the first controller 4 is connected to the output and to the "low" voltage level. The first capacitor $C_1$ is discharged. The second switchable connection 11 is now connected to the input, with the first switchable connection 6 being connected to the output and to the "high" voltage level. The second capacitor $C_2$ is charged via the adjusted actuating element 8 and the resistance $R_2$ of the second timer 10. The second controller 5 detects and stores the time value determined in this way for this charging section. The result of the second charging time measurement is subtracted from the first measurement. The result of this subtraction process is equal to the measured time value of the second controller 5. With regard to the method, the sequence of the abovementioned steps is, by way of example, as follows:

$T_{m1} = (x*R_P + R_1)*C_2$
$T_{m2} = ((R_P + R_1 + R_2)*C_1) - (((((1-x)*R_P) + R_1)*C_1)$
$T_{m2} = ((R_{P+R1})*C_1) + C_1) + R_2*C_1 - ((R_P + R_1)*C_1) + x*R_P*C_1$
$T_{m2} = (X*R_P + R_2)*C_1$ where:

$x*R_P$=resistance value setting on the actuating element 8
x=adjustment factor from, for example, 0.1 to 1
$T_{m1}$=time value of the first measurement, and
$T_{m2}$=time value of the second measurement Note:

The respective series resistance $R_{V1}$, and $R_{V2}$ is negligible in comparison to the resistances $R_P$, $R_1$ and $R_2$ of the actuating element 8, of the first timer 9 and of the second timer 10.

The subsequent comparison of the computationally determined value and of the value determined by measurement makes it possible to determine any difference which may exist and allow indirect comparison of the time values which are obtained from the resistance values. If any difference is found which is outside a definable tolerance band, no switching signal 20, 21 is output as a function of the time delay; in this case, the circuit arrangement 1 accordingly satisfies the requirements for a redundant safety control system.

The process of determining the respective time delay also includes monitoring of the value settings and, accordingly, monitoring of the corresponding output signal and of the respective preset tolerances. The calculation of the two delay times indicates that only the component tolerances of the two capacitors $C_1$ and $C_2$ have any effect on the result. The permissible discrepancy between the two measurement results is thus twice the tolerance of the capacitors $C_1$ and $C_2$. If, by way of example, capacitors with a tolerance of ±2% are used, this accordingly results in a discrepancy of 4%.

In order to identify short circuits on the actuating element 8, a total charging time is defined in the software/program. All the component tolerances must be included in this total charging time. If the charging time via all the resistances $R_P$, $R_1$ and $R_2$ is outside this tolerance, one or both of the controllers 4 and 5 identifies or identify a fault and, for example, jumps or jump to a fault routine. In consequence, the switching outputs 14, 15 are switched off and, for example, a fault code is generated, which results in a fault being indicated. Component drift likewise results in a fault being identified, once the drift exceeds a permissible tolerance. In the event of discontinuities in the actuating element 8 or in the event of a short circuit in one of the two capacitors $C_1$, $C_2$, the respective controller 4, 5 identifies a fault from the overflow of the watchdog counter—since the switchable connection of the appropriate controller never reaches the "high" voltage level—and jumps to a fault routine.

The circuit arrangement 1 and the associated method may, of course, also be configured such that the right-hand resistance branch is the part that is relevant for the time delay. In principle, the method is identical for both resistance branches, but the measurement result of the total resistance $R_{GM}$ of the first controller 4 is rejected, since this route determines only the second resistance element $R_{T2M}$.

An embodiment of the invention as explained above can be summarized as follows:

In order to ensure safe and reliable time-delayed signal outputting with a simple redundant configuration of a circuit arrangement 1, an embodiment of the invention provides for a common actuating element 8 to act on two timers 9, 10 with associated A/D converters 18 and 19, respectively. In this case, the time delay which is predetermined by the actuating element 8 and is relevant for the outputting of the switching signal 20, 21 is determined by forming the difference between a total resistance $R_{GM}$, detected by measurement, and first resistance element $R_{T1M}$, detected by measurement, followed by a comparison of the difference, which reflects second resistance elements $R_{T2R}$ that is determined by computation, with a second resistance element $R_{T2M}$ which is determined by measurement, with the switching signal 20, 21 being output with a time delay when there is a match between the second resistance element determined by measurement $R_{T2M}$ and that determined by computation $R_{T2R}$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A circuit arrangement for an electronic system for time-delayed outputting of a switching signal, comprising:
   a first timer, adapted to convert an input signal to a first time-delayed output signal;
   a second timer, adapted to convert the input signal to a second time-delayed output signal, wherein the second timer is redundant with respect to the first timer;
   a common actuating element for the input signal for both the first and the second timers; and a control unit, for each timer, for computational and measurement determination of the time delay, which is predetermined by use of the actuating element, and for processing of a time delay which is relevant for the outputting of the switching signal.

2. The circuit arrangement as claimed in claim 1, wherein at least one of the first and second timers includes an RC element.

3. The circuit arrangement as claimed in claim 1, wherein the actuating element includes an adjustable passive electrical component.

4. The circuit arrangement as claimed in claim 3, wherein the passive component includes a variable resistor.

5. The circuit arrangement as claimed in claim 1, wherein at least one of the control units is at least part of a controller.

6. The circuit arrangement as claimed in claim 1, wherein at least one of the control units includes a programmable logic module.

7. A circuit arrangement for an electronic system as claimed in claim 1, wherein the electronic system is a safety control system.

8. The circuit arrangement as claimed in claim 2, wherein the actuating element includes an adjustable passive electrical component.

9. The circuit arrangement as claimed in claim 8, wherein the passive component includes a variable resistor.

10. The circuit arrangement as claimed in claim 2, wherein at least one of the control units is at least part of a controller.

11. The circuit arrangement as claimed in claim 10, wherein at least one of the control units includes a programmable logic module.

12. The circuit arrangement as claimed in claim 5, wherein at least one of the control units includes a programmable logic module.

13. A method for computational and measurement determination of a predetermined time delay and for the processing of a time delay which is relevant for the outputting of the switching signal of a circuit arrangement including a first and second timer and an actuating element, the method comprising:

determining a total resistance representative of a respective resistance of the first and the second timer and of the actuating element;

determining a first resistance element which represents the respective resistance of the first timer and of the actuating element;

computationally determining a second resistance element, representative of the respective resistance of the second timer and of the actuating element, by subtracting the determined first resistance element from the determined total resistance;

determining via measurement, the second resistance element, representative of the respective resistance of the second timer and of the actuating element; and comparing the computationally determined second resistance element with the second resistance element determined by measurement and time-delay outputting the switching signal as a function of the comparison.

14. The method of claim 13, wherein the switching signal is output when the computationally determined second resistance element matches the second resistance element determined by measurement.

15. A circuit arrangement for an electronic system for time-delayed outputting of a switching signal, comprising:

first timer means for converting an input signal to a first time-delayed output signal;

second timer means for converting the input signal to a second time-delayed output signal, wherein the second timer means is redundant with respect to the first timer means;

common actuating means for the input signal for both the first and the second timer means; and control means, for each timer means, for computational and measurement determination of the time delay, which is predetermined by use of the actuating means, and for processing of a time delay which is relevant for the outputting of the switching signal.

16. The circuit arrangement as claimed in claim 15, wherein at least one of the first and second timer means includes an RC element.

17. The circuit arrangement as claimed in claim 15, wherein the actuating means includes an adjustable passive electrical component.

18. The circuit arrangement as claimed in claim 17, wherein the passive component includes a variable resistor.

19. The circuit arrangement as claimed in claim 17, wherein at least one of the control units is at least part of a controller.

20. The circuit arrangement as claimed in claim 15, wherein at least one of the control units includes a programmable logic module.

21. The circuit arrangement as claimed in claim 19, wherein at least one of the control units includes a programmable logic module.

* * * * *